Nov. 8, 1949

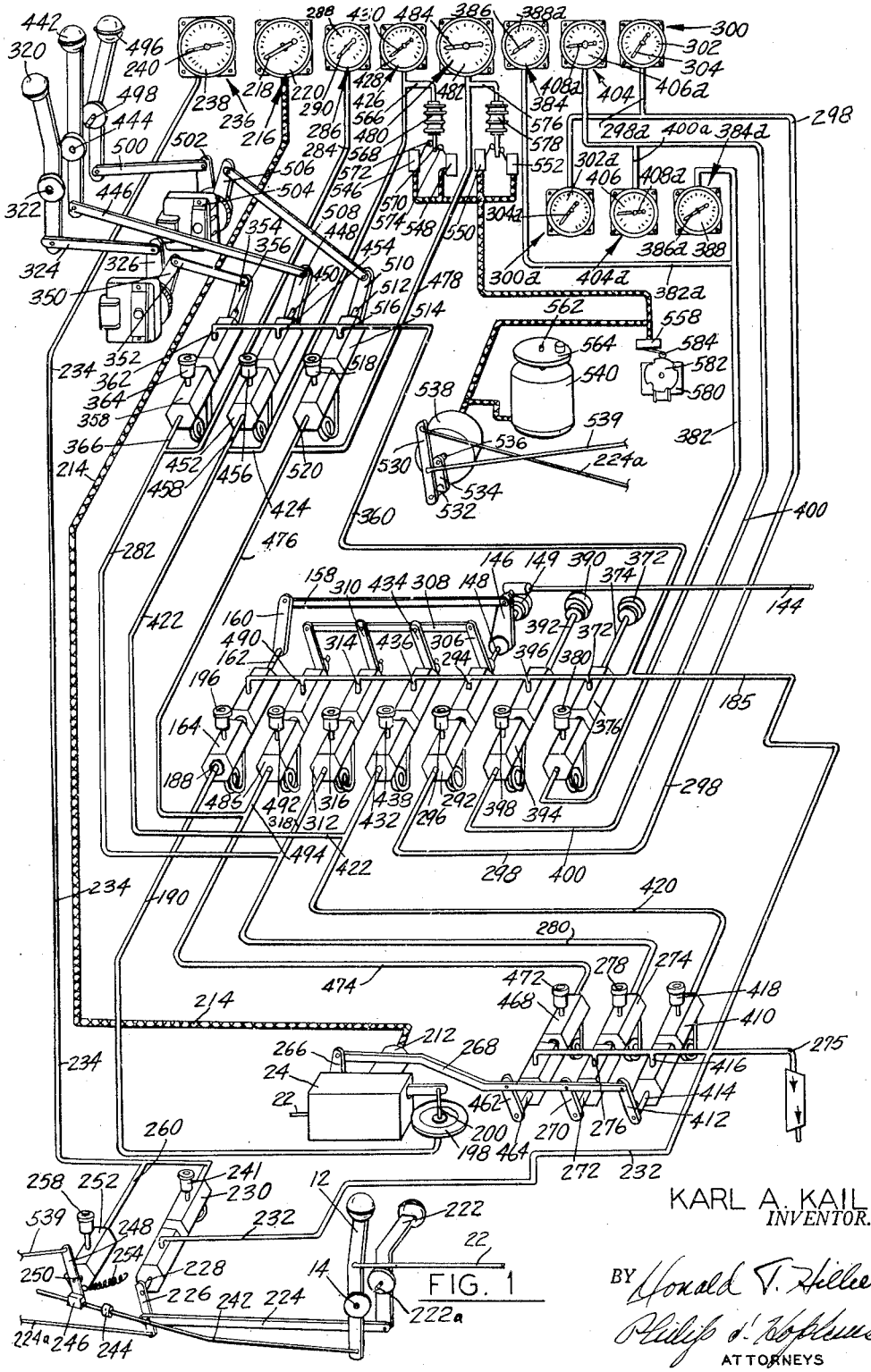

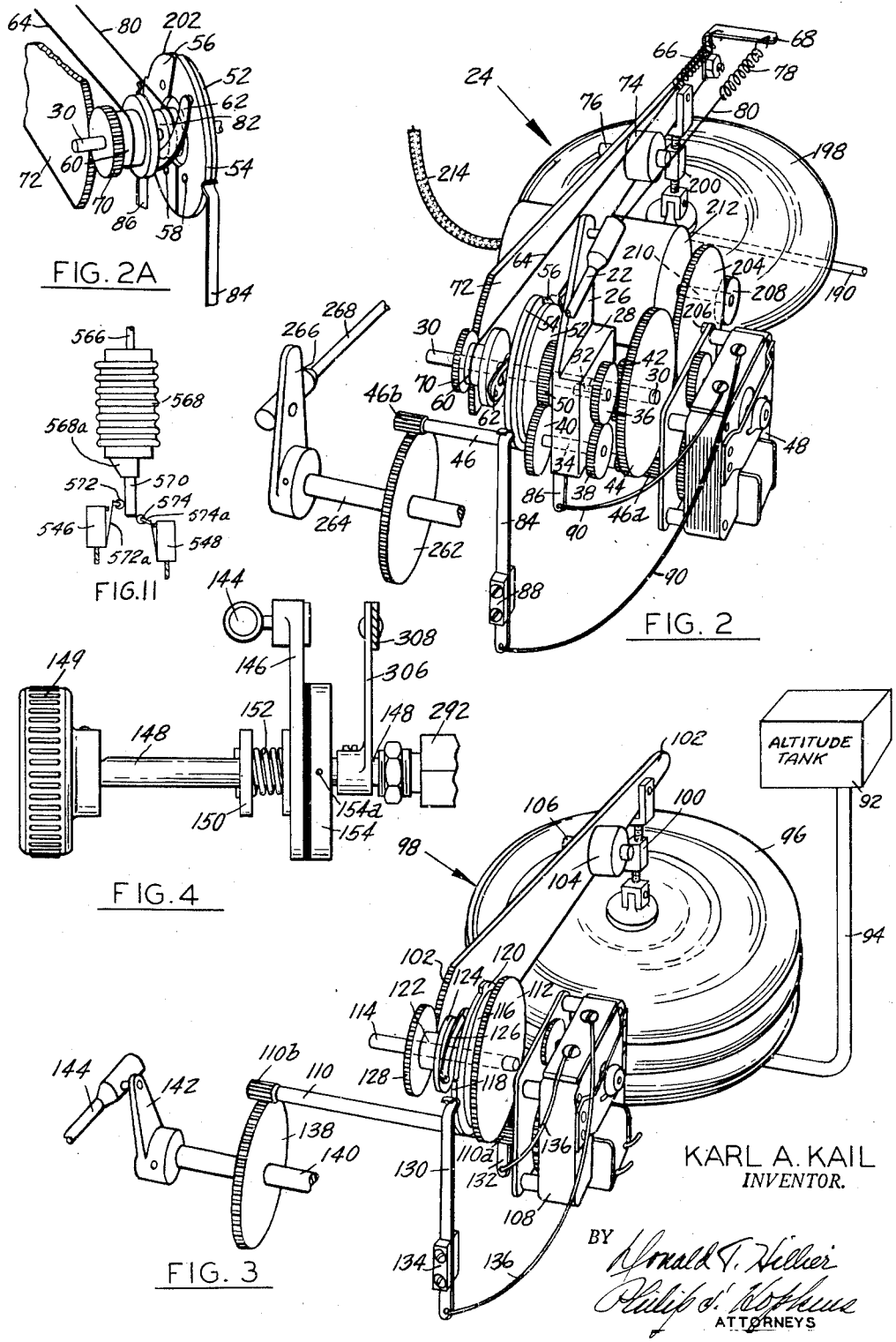

K. A. KAIL 2,487,758

INSTRUMENT SIMULATING MEANS FOR
GROUNDED AVIATION TRAINERS

Filed April 25, 1946

KARL A. KAIL
INVENTOR

BY Donald T. Hiller
Philip T. Robbins
ATTORNEY

Patented Nov. 8, 1949

2,487,758

UNITED STATES PATENT OFFICE 2,487,758

INSTRUMENT SIMULATING MEANS FOR GROUNDED AVIATION TRAINERS

Karl A. Kail, Montrose, Pa., assignor to Link Aviation, Inc., Binghamton, N. Y., a corporation of New York Application April 25, 1946, Serial No. 664,866

5 Claims. (Cl. 35—12)

This invention relates to apparatus for training students upon the ground to fly aircraft. Such training devices are well known to the prior art and there are several types presently in use, the most familiar being the type disclosed in U. S. Patents 1,825,462 and 2,099,857. After reading this disclosure, it will be appreciated that the invention covered herein may be used to advantage in many different types of grounded aviation trainers.

It is a principal object of this invention to provide in a grounded aviation trainer instruments simulating many of the engine instruments of a real aircraft and to cause each of these instruments to give an indicated reading in accordance with the various assumed conditions corresponding to the real conditions encountered in actual flight which affect the reading of each of the corresponding real instruments in a real aircraft. Illustrated herein are the following instruments: tachometer, manifold pressure gauge, oil temperature gauge, carburetor air temperature gauge, cylinder head temperature gauge, fuel pressure gauge, oil pressure gauge, and outside air temperature gauge. Each of these gauges with the exception of the manifold pressure gauge comprises essentially a conventional vacuum gauge having a face graduated to simulate the face of the corresponding real instrument and a needle mounted to move relative to the face of each of the instruments to indicate to the student, and in some cases to the instructor as well, the assumed engine condition indicated by the instrument. Variations in the readings of the vacuum operated instruments are obtained by varying the pressure within a line connected to the instrument in accordance with the variations in the assumed controlling factors. These controlling factors may be one or more of the following: throttle lever setting, engine speed lever setting, assumed altitude, assumed manifold pressure, assumed outside air temperature, assumed shutters setting, or the setting of a control knob selectively positioned by the instructor.

The manifold pressure gauge is actuated by means of a Selsyn transmitting system, such systems being well known to the prior art.

With the apparatus provided by this invention it is possible to impart to the student using the trainer much more realistic training because he is required to constantly observe all of the engine instruments in the trainer and maintain their readings within proper limits, just as he would be required to do were he actually flying an airplane.

Consequently, with the provision of the manifold pressure gauge the students must "fly" the trainer at the required assumed manifold pressure for any existing assumed conditions, such as flight attitude and altitude, and inasmuch as a tachometer is provided, the assumed engine speed must be properly maintained.

Insofar as oil temperature, carburetor air temperature, and cylinder head temperatures are concerned, the student must maintain these readings within proper limits by means of the provided shutter simulating instruments.

It is another feature of this invention to provide means for vibrating the trainer fuselage according to the instant assumed engine speed as shown by the tachometer, together with means for causing the vibrating mechanism to vibrate the fuselage in a different manner when the carburetor air temperature or cylinder head temperature is outside certain predetermined limits. This feature of my invention simulates the irregular performance of the engine of an actual aircraft when either the carburetor air temperature or cylinder head temperature is outside proper operating limits.

In order that the exact nature of my invention may be better understood, reference is made to the accompanying drawings wherein a preferred embodiment of my invention is disclosed. In the drawings, Fig. 1 is a general diagrammatic view showing the relationships of most of the important parts of my invention.

Fig. 2 is a detailed perspective view of the manifold pressure amplifier which may form a part of my invention.

Figure 2A is a detail perspective drawing of the switching arrangement incorporated in the apparatus shown in Figure 2.

Fig. 3 is a detailed disclosure of the altitude torque amplifier.

Fig. 4 is a detailed drawing of one of the instructor's controls and apparatus associated therewith.

Fig. 11 is an enlarged view of the engine vibration bellows and associated parts shown in Fig. 1.

Manifold pressure

Figure 5:
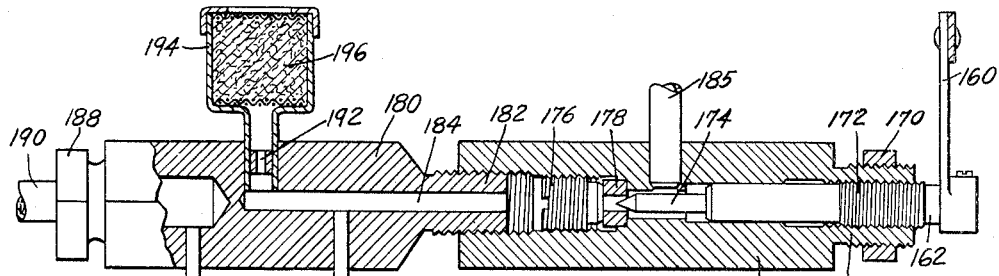
Fig. 5 is a cross sectional view of one of the valves which forms an important part in the systems of my invention.

In the case of a plane in actual flight the factors of throttle lever position and altitude affect the manifold pressure of the engine or engines of the plane, as indicated by the manifold pressure indicator. The farther ahead the throttle and the lower the altitude, the greater is the manifold pressure. Means for producing an assumed manifold pressure indication in accordance with these two factors will first be explained.

Considering first the factor of throttle lever position, reference is now made to Fig. 1 where the throttle lever is designated 12. Lever 12 is pivotally mounted at the point 14 inside the fuselage of the trainer in a proper position relative to the seat. Pivotally attached to the lever 12 above the pivot 14 is the fore end of link 22.

Reference is now made to Fig. 2 which is a detailed disclosure of the construction of the manifold pressure engine unit designated generally by 24. In Fig. 2 the rear end of the link 22 which is moved by the throttle lever is shown to be pivotally attached to the upper end of arm 26. It will be seen that the block 28 is integral with the arm 26 and that this block is rotatably mounted upon rod 30 which is fixedly held in the frame (not shown) of the unit. Two shafts 32 and 34 are rotatably mounted in the block 28. Upon the outer end of the shaft 32 is mounted the spur gear 36 while upon the outer ends of the shaft 34 are mounted the spur gears 38 and 40. Meshing with gear 36 is the spur gear 42 which is affixed to the large spur gear 44 which is rotatably mounted upon rod 30. Gear 44 is driven by the spline 46a upon shaft 46 and which in turn is driven by motor 48.

A suitable reduction gear train may be interposed between the motor 48 and the spline 46a.

Still referring to Fig. 2, rotatably mounted upon the fixed rod 30 and driven by gear 40 is the spur gear 50 which is affixed to the insulating ring 52 to rotate the same. Affixed to the insulating ring 52 are the two split contact segments 54 and 56. Considering now Fig. 2 in conjunction with Fig. 2A, it will be seen that the insulating disc 52 carries the split contact segments 54 and 56 by means of rivets 58. Rotatably mounted upon the fixed rod 30 is the drum 60 carrying the contact 62. A string 64 has its forward end wound around the drum 60 and attached thereto, while the rear end of this string is attached to the spring 66 which has its rear end attached to the fixed member 68.

Integral with the drum 60 is the gear 70 which is positioned by the gear sector 72. The gear sector 72 is pivotally mounted upon the circular block 74 integral with the rod 76 which is suitably held stationary. Spring 66 and string 64 bias drum 60 to remove the backlash between gear 70 and sector 72. A second spring 78 is affixed to the fixed member 68 as shown, and affixed to the other end of this spring is the string 80 which winds around and is anchored to the drum 82 which is affixed to the insulating disc 52. This spring and string arrangement biases the segments 54, 56 and insulating disc 52 to remove the backlash between these segments and motor 48.

A pair of spring contacts 84 and 86 are carried by the insulating members 88 (only one shown) which in turn are held by the frame of the unit so as to engage the contact segments 54 and 56, respectively. Each of the spring contacts 84 and 86 is connected to motor 48 by one of the conductors 90, and the contact 62 is grounded. Motor 48 is of the type that when contact 62 is in engagement with both of the contact segments 54 and 56, the motor is deenergized. When the contact 62 engages only the contact segment 54, motor 48 is energized to turn in one direction, and when contact 62 engages only the other contact 56, motor 48 is energized to turn in the opposite direction.

Assuming that the contact 62 is engaging both of the contact segments 54 and 56, the motor 48 will be at rest. If the throttle lever 12 is then pushed ahead, i. e., that is to the left in Fig. 1, the link 22 moves in the same direction. Referring to Fig. 2, the arm 26 and block 28 are rotated counterclockwise about the rod 30. Accordingly, gears 36, 38 and 40 and shafts 32 and 34 are likewise rotated counterclockwise about rod 30. Gear 42 remains stationary, and the coaction of gears 36 and 42 results in a rotation of the gear 38 upon the shaft 34, and consequently the gears 40 and 50 are rotated, resulting in a rotation of the gear 50 which is fixed to the insulating block 52. The rotation of gear 50 results in a counterclockwise rotation of the insulating block 50 and contact segments 54 and 56.

The counterclockwise rotation of the contact segments 54 and 56 will disengage the contact 62 from the contact segment 56 and the contact 62 will engage only segment 54. As a result, motor 48 will be energized so that the shaft 46 rotates clockwise as seen from the right in Fig. 2. The running of motor 48 will result in a rotation of the gears 44, 42, 36, 38, 40 and 50, and the rotation of gear 50 will rotate the insulating disc 52 and contact segments 54 and 56 clockwise. The motor 48 will continue to run until it has rotated the contact segments 54 and 56 through the same angle but in the opposite direction from which they were rotated as a result of the movement of the throttle lever 12 and link 22. When the contact segments 54 and 56 have been rotated through this angle, the contact 62 will again engage both of the contact segments 54 and 56, and motor 48 will stop.

On the other hand, assuming that the contact 62 is engaging both of the contact segments 54 and 56, if the throttle lever 12 is moved to the rear, link 22 moves toward the rear in Figs. 1 and 2. Arm 26 is rotated clockwise as is block 28 and the movement of block 28 carries with it the shafts 32 and 34 and the gears 36, 38 and 40. The coaction of gear 36 with gear 42, which remains stationary, results in a rotation of gear 36 and the rotation of this gear is imparted to the gear 50 through the intermediate gearing. The rotation of gear 50 is in a clockwise direction and the contact segments 54 and 56 move therewith. Contact 62 will become disengaged from segment 56 but will remain in engagement with segment 54. The motor 48 is as a result energized and the splined shaft 46 is rotated in a counterclockwise direction. The running of motor 48, through the gears 44, 42, 36, 38, 40 and 50, results in a counterclockwise rotation of the split contact segments 54 and 56. The running of the motor continues until these two contact segments again are both in engagement with the contact 62. At this point motor 48 stops.

It will therefore be appreciated that the direction and magnitude of the output of motor 48 is dependent upon the setting of throttle lever 12, and consequently the angular position of shaft 46 with respect to a predetermined zero position is dependent upon the position of throttle lever 12. Accordingly, the angular position of shaft 46 with respect to an initial zero position may be taken as a measure of assumed manifold pressure insofar as this factor is responsive to changes in the setting of the throttle lever.

As previously stated, the second factor which affects the manifold pressure of a plane in actual flight is the altitude of the plane—the higher the altitude the lower becomes the manifold pressure. Means for introducing the factor of assumed altitude to affect the indicated manifold pressure will now be explained.

Reference is now made to Fig. 3 where the conventional altitude tank which is well known to the prior art and is disclosed in U. S. Patent 2,099,857 is designated 92. At this point the statement is simply made that the pressure within altitude tank 92 varies inversely with the assumed altitude of the trainer, i. e., the higher the assumed altitude, the lower is the pressure within the tank. Means for varying the pressure within the tank in response to factors corresponding to the factors which affect the real altitude of a plane in actual flight are thoroughly understood by those skilled in the prior art, and described in the patent just mentioned. In Fig. 3 it will be seen that the altitude tank is connected through line 94 with the Sylphon bellows 96 which forms a part of the altitude torque amplifier designated generally by 98. It will be seen in Fig. 3 that pivotally attached to the top of bellows 96 is the link 100, the upper end of which is pivotally attached to the rear end of the gear sector 102. Gear sector 102 is pivotally mounted upon the enlarged portion 104 of the transverse rod 106 which is fixed in the frame (not shown) of the unit.

Still referring to Fig. 3, it will be seen that the altitude torque amplifier 98 includes a reversible drive motor 108 driving the shaft 110 which is splined at 110a and 110b. The spline 110a drives the gear 112 which is rotatably mounted upon the rod 114 which is fixed in the frame (not shown) of the unit. An insulating disc 116 is affixed to gear 112 for rotation therewith, and a pair of mutually insulated contact segments 118 and 120 are affixed to the insulating disc 116. A drum 122 is also rotatably mounted upon the fixed rod 114, the inner flange 124 of drum 122 carrying the contact 126. The outer flange of drum 122 is designated 128, and as shown, this flange is in the form of a gear. A pair of contacts 130 and 132 are held by the insulators 134 (only one shown) in turn held by the frame of the unit so as to engage, respectively, the contact segments 118 and 120. Each of the contacts 130 and 132 is connected to the motor 108 through one of the conductors 136.

A detailed view of the gear 112, insulating disc 116, contact segments 118 and 120, contact 126 and contacts 130 and 132 is not deemed necessary because this arrangement is similar to that shown in Fig. 2A.

When the pressure within the altitude tank 92 shown in Fig. 3 decreases as a result of an increase in assumed altitude, it will be appreciated that the bellows 96 is collapsed by an amount dependent upon the decrease in pressure within the tank. Link 100 moves downwardly and the fore end of sector 102 is moved up, rotating drum 122 counterclockwise. Assuming that the contact 126 was previously in engagement with both of the contact segments 118 and 120, in which case motor 108 would be at rest, it will be appreciated that the rotation of drum 122 will move contact 126 out of engagement with the segment 118 and the motor 108 will be energized to rotate the shaft 110 clockwise. The clockwise rotation of shaft 110 results in a counterclockwise rotation of the gear 112, insulating disc 116, and contact segments 118 and 120. The energization of the motor and the turning of the output shaft 110 and of the contact segments 118 and 120 continues until the contact segments are again both engaged by the contact 126. At this instant the motor 108 stops.

On the other hand, should the pressure within the altitude tank 92 be increased, the increase in the pressure within bellows 96 will result in an expansion of this bellows. The fore end of sector 102 moves downwardly and the drum 122 is rotated clockwise. Contact 126 is moved out of engagement with contact segment 118, energizing motor 108 so that it rotates the output shaft 110 counterclockwise. The gear 112 is rotated clockwise carrying with it the insulating disc 116 and contact segments 118 and 120, and when the contact segments 118 and 120 are again both brought into engagement with the contact 126, motor 108 stops.

In view of this explanation it will be appreciated that the output shaft 110 is rotated clockwise in response to a decrease in the pressure within altitude tank 92 while shaft 110 is rotated counterclockwise in response to an increase in the pressure within tank 92. In both cases the total angular rotation of the shaft 110 will be proportional to the magnitude of the change of the pressure within tank 92. Accordingly, shaft 110 is always angularly positioned from a predetermined neutral position according to the assumed altitude of the trainer. The angular position of this shaft may, therefore, be utilized to introduce into the manifold pressure engine unit 24 seen in Fig. 2 the factor of assumed altitude, so that the output of this unit will be dependent upon assumed altitude.

Still referring to Fig. 3, it will be seen that the gear 138 is arranged to be rotated by the spline 110b. This gear is affixed upon shaft 140 which is rotatably mounted in the frame of the altitude torque amplifier 98. Affixed upon the left end of shaft 140 is the arm 142, to the upper end of which is pivotally connected the rear end of link 144. Referring now to Fig. 4 it will be seen that the fore end of link 144 is pivotally connected to the upper end of the arm 146.

In Fig. 4 it will be seen that the arm 146 is freely mounted upon the shaft 148, upon the outer end of which is affixed the instructor's control knob 149. A stop 150 is affixed upon shaft 148, and a compression spring 152 bears against this stop and the arm 146 to force the arm 146 against the rubber-faced disc 154 which is affixed upon shaft 48 by pin 154a. One end of link 158 is pivotally connected to the upper end of arm 146, and the fore end of link 158 is pivotally connected to the upper end of arm 160, as shown in Fig. 1, the lower end of which is affixed upon the outer end of the shaft 162 of the altitude manifold pressure valve 164.

It has been stated that the angular position of shaft 110 in Fig. 3 depends upon the instant assumed altitude, and therefore, the position of arm 146 in Fig. 4 also depends upon the same factor. As the upper end of arm 146 changes in response to changes in assumed altitude, it will be appreciated that the shaft 148, knob 149, rubber faced disc 154 and arm 306 which is affixed upon shaft 148 are moved in a direction depending upon whether assumed altitude has increased or decreased and through a distance dependent upon the magnitude of the change in assumed altitude. Accordingly, the upper end of arm 146 in Fig. 4 as well as the link 158 and arm 160 in Fig. 1 are always positioned according to instant assumed altitude.

Reference is now made to Fig. 5 for a detailed disclosure of the valve 164. This valve comprises a main body portion 166 having integral therewith the extension 168 which is exteriorly tapered and is also threaded within its inner side. Lock nut 170 is provided. The previously mentioned stem of the valve is designated 162 and the operating arm 160 is shown. Integral with the stem are the threads 172 which coact with the threads within extension 168.

Integral with the stem 162 is the needle 174, tapered as shown. The plug 176 holds the seat 178 of the valve in place, plug 176 being hollow to permit the passage of vacuum therethrough. The capillary and bleed hole fitting assembly comprises a main body portion 180 having integral therewith the threaded extension 182 which fits inside the interiorly threaded left end of the main body portion 166. The body portion 180 is drilled at 184 to permit the passage of vacuum from the vacuum line 185 therethrough, and the capillary 186 connects the drilled portion 189 with the exterior fitting 188 which is connected with the Sylphon bellows 198 of the manifold pressure engine unit through the vacuum line 190 seen in Fig. 2. Bleed hole 192 connects the capillary 186 at all times with the atmosphere through the cup 194 which is filled with a suitable straining material 196, such as cotton. Sylphon bellows 198 is airtight in construction and therefore by changing the pressure within this bellows it may be made to expand or contract.

Referring to Figs. 1 and 5, it will be appreciated that atmosphere enters the Sylphon bellows 198 at all times by virtue of the bleed hole 192. In the absence of other controlling factors, therefore, the pressure within bellows 198 would at all times be equal to the atmospheric pressure. However it will be appreciated that the position of needle 174 relative to seat 178 depends upon the position of the operating arm 160 which, as previously explained, is always positioned in accordance with the instant assumed altitude. When the assumed altitude is zero, the apparatus is arranged so that the valve formed by needle 174 and seat 178 is closed, and so assumed altitude has no effect upon the Sylphon bellows 198 in Fig. 2. However, as the shaft 110 in Fig. 3 is rotated clockwise in response to a decrease in presure within tank 92, the arm 160 in Fig. 1 is rotated counterclockwise, and the altitude manifold pressure valve 164 is opened because it is left threaded. On the other hand, when shaft 110 in Fig. 3 is rotated counterclockwise in response to an increase in pressure within tank 92, arm 160 in Fig. 1 is rotated clockwise and valve 164 is closed. Accordingly, valve 164 is always opened an amount depending upon the instant assumed altitude. Vacuum will therefore be admitted to the interior of Sylphon bellows 198 in Fig. 2 in an amount dependent upon the instant assumed altitude—the higher the assumed altitude the greater the vacuum admitted. Consequently, bellows 198 is contracted in response to an increase in assumed altitude, and expanded in response to a decrease in assumed altitude, and its instant distension depends upon the instant assumed altitude. It will therefore be appreciated that the expansion and contraction of the Sylphon bellows 198 may be used as a measure of changes in the assumed manifold pressure insofar as the assumed manifold pressure is dependent upon assumed altitude.

Bearing in mind the earlier detailed construction of the manifold pressure engine unit shown in Fig. 2, it will be appreciated that whenever the bellows 198 is collapsed as a result of an increase in assumed altitude, the link 200 which has its lower end pivotally attached to the top of the bellows will be moved downwardly and inasmuch as the upper end of this link is pivotally connected to the rear end of sector 72, the rear end of sector 72 will also move downwardly, pivoting upon the boss 74 integral with the shaft 76 fixed in the frame of the unit. The fore end of sector 72 will move upwardly, drum 60 will be rotated counterclockwise, and the contact 62 will be moved in the same direction and out of engagement with contact segment 56. Motor 48 will therefore be energized in such a direction that the output shaft 46 is rotated counterclockwise. The counterclockwise rotation of the output shaft 46 will result in a counterclockwise rotation of the contact segments 54, 56, and motor 48 will continue this rotation until both of the contact segments 54 and 56 are again engaged by the contact 62. At this instant motor 48 will stop. It will be appreciated that the angular rotation of the output shaft 46 will be dependent upon the extent of the collapsing of the Sylphon bellows 198 which is dependent upon the magnitude of the increase in assumed altitude.

It should be noted that whenever the throttle lever 12 shown in Fig. 1 is moved to the rear, the output shaft 46 is rotated counterclockwise by motor 48, and that when the Sylphon bellows 198 is collapsed as a result of an increase in assumed altitude, the output shaft 46 also rotates counterclockwise. It will therefore be appreciated that the output shaft 46 is always rotated counterclockwise by the motor 48 in response to a positioning to the rear of the throttle lever 12 and an increase in assumed altitude. Accordingly, the shaft 46 is rotated counterclockwise through an angle proportional to decreases in the assumed manifold pressure.

On the other and, should the Sylphon bellows 198 be expanded as a result of an increase in the pressure within the altitude tank 92, which increase would occur as a result of a decrease in the altitude of the trainer, it will be appreciated without a detailed explanation that the contact segment 62 will be rotated clockwise and that the motor 48 will be energized to rotate the shaft 46 in a clockwise direction until the two contact segments 54 and 56 again both engage the contact 62. The angular rotation of shaft 46 in this direction will depend upon the amount of expansion of the bellows 198 which will depend upon the magnitude of the decrease in assumed altitude. It will be recalled that the output shaft 46 is also rotated clockwise in response to a forward movement of the throttle lever 12. Accordingly, the output shaft 46 is always rotated clockwise through an angle proportional to increases in the pressure within tank 92 and proportional to forward movements of the lever 12.

In the case of a plane in actual flight a forward movement of the throttle lever increases the manifold pressure of the engine by an amount dependent upon the angle through which the lever is moved. Rearward movement of the lever results in a proportional loss of manifold pressure. At the same time, manifold pressure is dependent upon altitude—an increase in altitude causing a drop in manifold pressure. In view of the disclosed apparatus, it will be understood that the angular position of shaft 46 in Fig. 2 from a predetermined zero position may be taken as a measure of the instant assumed manifold pressure.

Parenthetically, at this point it should be noted that a notch 202 is placed in contact segment 56 seen in Fig. 2A. In the operation of the unit in question the contact segments 54 and 56 are never rotated in response to a movement of the throttle lever so far as to move notch 202 opposite the contact 86. Notch 202 is therefore provided to limit the rotation of the contact segments when motor 48 in Fig. 2 is energized as a result of the rotation of contact 62 caused by an expansion of bellows 198. When contact 86 is opposite notch 202, motor 48 will not run to rotate the contact segments further.

In Fig. 2 it will be seen that the gear 44 drives gear 204 which is rotatably mounted upon the rod 206 which may be fixed in the frame of the unit. Gear 204 in turn drives gear 208 which is fixed upon the input shaft 210 of the Selsyn-type transmitter 212 which is connected by electrical cable 214 to a Selsyn-type receiver (not shown) forming a part of the simulated manifold pressure indicator 216 seen in Fig. 1 which is mounted upon the instrument panel of the trainer. As is well known to the prior art, indicator 216 comprises a needle 218 mounted upon the output shaft of the Selsyn-type receiver and arranged to move over a dial 220 graduated in terms of manifold pressure to indicate the assumed manifold pressure. As will be understood by those skilled in the art, needle 218 is always positioned with respect to dial 220 according to the position of gear 208 in Fig. 2, this gear being positioned according to the position of shaft 46 which is a measure of the instant assumed manifold pressure. Accordingly, the manifold pressure indicator 216 always indicates to the student the assumed instant manifold pressure which depends upon the position of the throttle lever 12 and the assumed altitude.

Tachometer

A large proportion of present-day aircraft are equipped with means for governing the speed of the engine or engines of the plane regardless of the setting of the throttle control lever associated with the engine. Such means generally comprise a manually operated lever, referred to as the engine speed lever or propeller pitch control lever, and is positioned by the pilot according to the desired speed of the engine being regulated. This lever operates a governor arrangement which maintains the speed of the engine at the value for which the lever is set, regardless of the position of the throttle control lever, with the exception that if the engine speed lever is set at an advanced position so as to cause the engine to run at a high rate of speed, if the throttle lever is retarded beyond a given point, insufficient fuel will be introduced to the engine to maintain the high rate of speed for which the governor control lever is set. Accordingly, the speed of the engine drops off to that speed which the engine is able to maintain for the instant throttle lever position.

Means for simulating the operation of the tachometer which indicates to the pilot the engine speed of a plane equipped with an engine speed control will now be disclosed.

Reference is made to Fig. 1 where the engine speed control is designated 222. This control is pivotally mounted about the axis 222a and pivotally attached to the lower end of lever 222 is the rear end of link 224, the forward end of which is pivotally attached to the lower end of the arm 226 which is affixed upon the stem 228 of the tachometer valve 230. Valve 230 is identical in construction with the valve shown in detail in Fig. 5 with the exception that the stem 228 is right-threaded. A detailed disclosure of this valve will therefore not be given. It will be seen that this valve is connected with the vacuum source through the vacuum lines 232 and 275 and that it is also connected with the simulated tachometer 236 through the vacuum line 234. Tachometer 236 comprises a dial 238 graduated in the same manner as the tachometer of a real plane. This instrument also has a needle 240 arranged for movement over dial 238 in order to indicate to the student the instant assumed engine speed. The interior construction of tachometer 236, being like a conventional vacuum gauge and well-known to the prior art, will not be disclosed herein. Tachometer valve 230 has a bleed 241 through which atmosphere may pass into the line 234 and to gauge 236 at all times.

In view of the above described arrangement it will be appreciated that the apparatus is arranged so that when the engine speed control lever 222 is in the retarded position, i. e., to the right in Fig. 1, the tachometer valve 230 similarly will be closed and no vacuum will be applied from the vacuum source through this valve to the line 234 and thence to the tachometer 236. Instead, atmosphere passes through the bleed 241 to the tachometer 236. Accordingly, the needle 240 will be in its most counterclockwise position and will indicate to the student that the engine assumed to be associated with the tachometer is not running. However, the farther the lever 222 is moved ahead, the greater will be the opening of the tachometer valve 230 and the greater will be the vacuum applied to the mechanism within tachometer 236. Accordingly, the farther the lever 222 is moved ahead, the farther the needle 240 will be rotated clockwise, thus indicating to the student a higher assumed engine speed.

Figure 6:
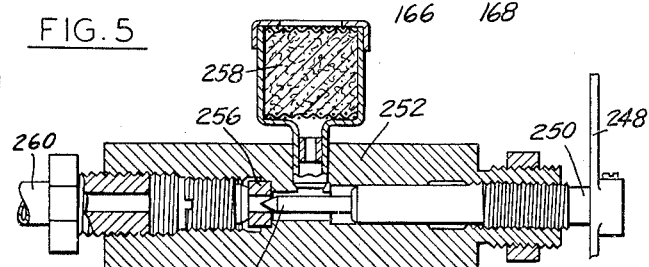
Fig. 6 is a cross sectional view of another valve which may be used in conjunction with my invention.

Still referring to Fig. 1, it will be seen that the rear end of link 242 is pivotally connected to the lower end of the throttle lever 12. Near the forward end of this link is mounted the stop 244 and the portion of link 242 ahead of stop 244 passes through the block 246 which is carried by the lower end of arm 248 which is affixed upon the outer end of the stem 250 of the throttle tachometer valve 252. A spring 254 has one end connected to the arm 248 and its other end connected to any suitable fixed member in order to maintain the arm 248 in its most counterclockwise position. Inasmuch as valve 252 is left-threaded, it will be appreciated that this spring normally maintains valve 252 in its closed position. Reference is made to Fig. 6 for a detailed disclosure of the construction of the throttle lever-controlled tachometer valve 252. It will be appreciated that this valve is greatly similar to the valve shown in Fig. 5 and therefore that it need not be described in detail. However, it will be noted that this valve comprises essentially a needle 254a and seat 256 interposed between the atmosphere bleed 258 and the line 260 which connects with the line 234 previously described as being connected with the tachometer 236.

In view of this arrangement, when the throttle lever 12 is positioned ahead of a predetermined point, the spring 254 maintains the valve 252 closed, and consequently the throttle lever has no effect upon the reading of the tachometer 236. However, assuming that the throttle control lever 12 is positioned to the rear of a predetermined point, the stop 244 engages the block 246 and arm 248 is rotated clockwise, opening valve 252 and permitting the admission of air through the bleed 256 into the vacuum line 234. Accordingly, the pressure within line 234 which is applied to the tachometer 236 will be greater, and the reading of this instrument is decreased. The farther to the rear of the predetermined point the throttle control lever 12 is placed, the greater will be the reduction in the reading of tachometer 236.

Accordingly, it will be appreciated that this invention discloses means for reducing the reading of the tachometer when the throttle control lever is retarded beyond a predetermined position, thus accurately simulating the effect of a retarded throttle lever upon the engine speed of an aircraft engine equipped with engine speed control means.

Outside air temperature

Figure 7:
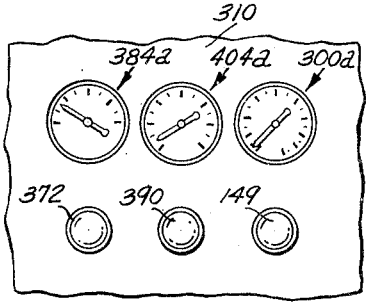
Fig. 7 is a view of a portion of the trainer fuselage showing the three instructor's controls and the corresponding instructor's indicating instruments.

Referring to Fig. 4, it will be seen that the manually controlled knob 149 is affixed upon the outer end of shaft 148 and that this shaft enters the outside air temperature valve 292. Valve 292 is identical with the valve disclosed in Fig. 5 with the exception that it is a right threaded valve. Movement of the control knob 149 controls the position of the needle of this valve relative to the seat and, as seen in Fig. 1, inasmuch as this valve is connected to the vacuum source through the pneumatic lines 185 and 294, as well as with the atmosphere through the bleed 296, it will be appreciated that the instructor, by manipulation of the control knob 149, may regulate the pressure within the pneumatic lines 298 and 298a which connect with the outside air temperature gauges 300 and 300a, line 298 connecting with gauge 300a through the branch 298a. Gauge 300 is placed upon the instrument panel within the fuselage of the trainer while gauge 300a is held by one of the side walls 301 of the fuselage so as to be visible to the instructor who is stationed outside the fuselage. This arrangement is shown in Fig. 7. Each of the gauges 300 and 300a comprises a dial 302 or 302a calibrated like the outside air temperature gauge of actual aircraft and each has a needle 304 or 304a arranged to move clockwise over the associated dial with an increase in the vacuum applied to the lines 298 and 298a. The inside of each of these gauges may be the same as a conventional vacuum gauge.

Rotation of knob 149 and shaft 148 does not affect the position of arm 146 because slippage occurs between the clutch members 146 and 154.

In the case of a plane in actual flight, the higher the altitude of the plane the lower becomes the outside air temperature. Means for automatically changing the indications of the outside air temperature gauges 300 and 300a in accordance with assumed changes in altitude will now be explained.

Referring to Fig. 1 it will be recalled that the link 144 is always positioned according to the instant assumed altitude. When assumed altitude increases link 144 moves to the left and when assumed altitude decreases it moves to the right. When link 144 moves to the left in Fig. 1 in response to an increase in assumed altitude, the arm 146 also moves to the left. Referring also to Fig. 4, it will be appreciated that the shaft 148 of valve 292 is rotated counterclockwise in Fig. 1 and that valve 292 is closed proportionately, resulting in an increase in pressure in the line 298, and a lower reading of the gauges 300 and 300a. It will be readily appreciated that a decrease in assumed altitude will open valve 292 proportionately and that the gauges 300 and 300a will indicate a higher assumed outside air temperature.

Oil temperature

Most aircraft are equipped with an instrument upon the instrument panel which indicates to the pilot the engine oil temperature. In general the three factors of manifold pressure, outside air temperature and the position of the oil shutters govern the oil temperature and consequently, the indication given to the pilot of the plane by the oil temperature gauge. The following means are provided in order that there may be indicated to the student an instant assumed oil temperature dependent upon the corresponding three factors.

Referring to Fig. 2, it will be recalled that the rotatable position of shaft 46 with respect to a predetermined neutral position is always dependent upon the assumed manifold pressure. Upon the far end of this shaft is the integral spline 46b which controls the position of the gear 262 affixed upon the rotatably mounted shaft 264. Upon the far end of shaft 264 is fixed the arm 266 to the upper end of which is pivotally attached one end of link 268. By virtue of this arrangement it will be appreciated that the link 268 is always positioned in accordance with the instant assumed manifold pressure.

Referring now to Fig. 1, it will be seen that the link 268 has pivotally attached thereto the upper end of arm 270, the lower end of which is affixed upon the stem 272 of the manifold pressure controlled oil temperature valve 274. This valve is identical in construction with the valve shown in detail in Fig. 5 with the exception that the valve is right threaded. It will be seen in Fig. 1 that this valve is provided with a vacuum inlet 276 and an atmosphere bleed 278, and its output 280 is connected to the pneumatic line 282 which in turn is connected to the pneumatic line 284 which connects with the oil temperature gauge 286.

The oil temperature gauge 286 comprises essentially a conventional vacuum gauge with a dial 288 calibrated in terms suitable for indicating assumed oil temperature. The greater the vacuum applied to this gauge the farther its needle 290 is rotated clockwise to indicate to the student a higher assumed oil temperature.

It will be appreciated, referring to Fig. 2, that as assumed manifold pressure increases the shaft 46 is rotated clockwise through an angle proportional to the magnitude of the assumed increase. Accordingly the link 268 in Figs. 1 and 2 moves to the left a distance proportional to the assumed increase in manifold pressure. On the other hand, should an assumed decrease in manifold pressure occur, the shaft 46 would be rotated counterclockwise through an angle proportional to the assumed decrease and the link 268 would be moved in the opposite direction a proportional distance. Accordingly, the position of link 268 is always in accordance with the instant assumed manifold pressure and it will be appreciated that the manifold pressure oil temperature valve 274 seen in Fig. 1 will always be opened by an amount in accordance with the instant assumed manifold pressure. Accordingly, the amount of vacuum which passes through this valve to affect the pressure within pneumatic lines 280, 282 and 284 which are connected to the oil temperature gauge 286 is in accordance with instant assumed manifold pressure. Therefore the indication of the oil temperature valve 286 will always be in accordance with this same factor, and the higher the assumed manifold pressure the higher is the indicated oil temperature.

Considering now the effect of assumed outside air temperature upon assumed oil temperature, inasmuch as the rotatable position of the control knob 149 in Fig. 4 is always in accordance with the indicated assumed outside air temperature, it will be appreciated that the arm 306 which is affixed upon the shaft 148 is also always positioned according to the instant outside air temperture. In Fig. 1 arm 306 moves to the left with a decrease in assumed outside air temperature and will move in the opposite direction with an increase. The right end of link 308 is pivotally attached to the upper end of arm 306 while the upper end of arm 310 is pivotally attached to the link 308, the lower end of arm 310 being affixed upon the stem of the outside air temperature oil temperature valve 312 which also is identical with the valve shown in Fig. 5 with the exception that it has a right hand thread. By virtue of this arrangement the valve 312 is always opened an amount dependent upon the instant assumed outside air temperature—the higher the temperature the more this valve will be opened. This valve is connected to the vacuum source through the lines 185 and 314 and is connected to the atmosphere through the bleed 316. Also, the output of this valve is connected by means of line 318 to the line 282 which connects with the oil temperature gauge 286 through the line 284. Accordingly, the pressure within line 318 varies inversely with the assumed outside air temperature and the pressure in this line controls the pressure within line 282 together with the manifold pressure oil temperature valve 274 which controls the pressure within line 280. Accordingly, the reading of the oil temperature valve 286 is controlled in part by the valve 312 which introduces a factor dependent upon the instant assumed outside air temperature. It will be understood that an increase in assumed outside air temperature results in an increased assumed oil temperature indication, and vice versa.

Aircraft of the type being simulated are provided with oil shutters which may be opened and controlled by the pilot in order to control the temperature of the oil used to lubricate the engine. This arrangement ordinarily comprises a hand operated lever or the like which opens and closes the shutters associated with the oil radiator. By opening the shutters the pilot may, of course, reduce the temperature of the oil while closing the shutters has the opposite effect. A change in the shutter position results in a gradual change in the oil temperature as indicated by the oil temperature gauge. Means for simulating this arrangement will now be described.

Figure 8:
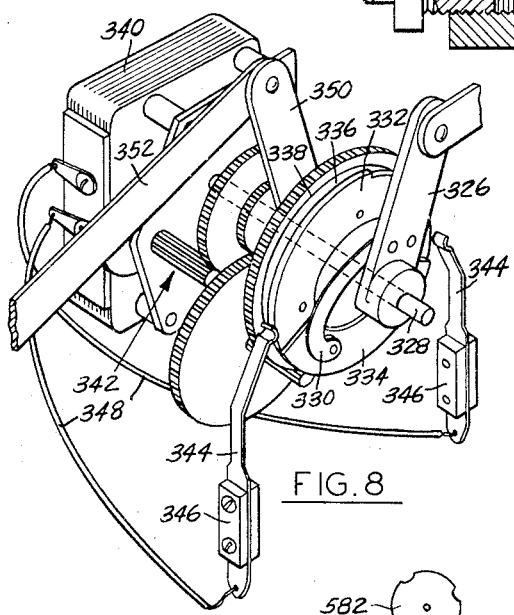
Fig. 8 is a detailed perspective view of one of the time delay systems which forms an important part of my invention.

Referring to Fig. 1, it will be seen that a lever 320 pivotally mounted about the axis 322 is provided, this lever preferably being located inside the fuselage of the trainer in order to be controlled by the student. Pivotally attached to the lower end of lever 320 is the forward end of link 324, the rear end of which is pivotally attached to the upper end of arm 326. Referring now to Fig. 8, it will be seen that the lower end of arm 326 is rotatably mounted upon the rod 328 which may be fixedly mounted in a suitable frame member. The movable contact 330 is carried by arm 326 and is adapted to bear against one or both of the split contact segments 332 or 334, or both of these segments, depending upon their relative rotational positions. Segments 332 and 334 are fixed to the insulating disc 336 which in turn is carried by the gear 338 which is driven by the motor 340 through the intermediate reduction gear train 342. A pair of spring contacts 344 carried by the fixed insulating members 346 engage the split contact segments and each of these spring contacts is connected to the motor 340 through one of the conductors 348. In view of the above similar previously described arrangement shown in Fig. 3, it will be appreciated that as the control lever 320 in Fig. 1 is moved, the contact 330 in Fig. 8 is rotated relative to the contact segments 332 and 334. When this contact segment engages both of the mutually insulated contact segments 332 and 334, motor 340 does not run. However, when contact 330 engages only the segment 332, motor 340 is energized and shaft 328 is rotated, the direction of rotation depending upon which segment the contact 330 engages.

Affixed to gear 338 for movement therewith is the arm 350 to the upper end of which is pivotally connected the fore end of link 352 which, as seen in Fig. 1, has its rear end pivotally connected to the upper end of arm 354, the lower end of which is fixed upon the stem 356 of the oil shutters oil temperature valve 358. This valve is connected to the vacuum source through the pneumatic lines 185, 360 and 362, as well as to the atmosphere through the bleed 364. Also, this valve is connected to the oil temperature gauge 286 through the lines 366 and 284. Valve 358 is also identical with the valve shown in Fig. 5, being left threaded.

Referring to Fig. 1 it will be appreciated that when the oil shutters control lever 320 is moved ahead or to the left in Fig. 1, the link 324 moves toward the rear and arm 326 is rotated clockwise as seen in Fig. 1, counterclockwise as seen in Fig. 8. Accordingly, assuming that before this movement contact 330 in Fig. 8 engaged both of the contact segments 332 and 334, contact 330 is moved out of engagement with contact segment 332 but remains in engagement with contact segment 334. Motor 340 is energized to rotate the gear 338, the insulating disc 336 and the contact segments 332 and 334 counterclockwise in Fig. 8 until both of the segments 332 and 334 again engage the contact 330. At this instant motor 340 will stop. Because of the interposition of the reduction gear train 342, it will be appreciated that a substantial elapse of time will occur between the movement of the oil shutters lever 320 and the final stopping of motor 340. While the motor 340 is running it will be appreciated that the link 352 is moved to the left in Fig. 8—to the right in Fig. 1—and that the oil shutters oil temperature valve 358 is gradually closed, gradually increasing the pressure within line 366 which connects with the line 284 running to the oil temperature gauge 286, and this gauge indicates a gradual falling off of assumed oil temperature.

On the other hand, assuming that the contact 330 in Fig. 8 is in engagement with both of the contact segments 332 and 334, if the oil shutters control lever 320 is moved to the rear or to the right in Fig. 1, it will be appreciated that the contact 330 is rotated clockwise in Fig. 8 so that it does not engage the segment 334. Accordingly, motor 340 is energized to rotate the gear 338 clockwise until both of the segments 332 and 334 engage the contact 330. At that instant motor 340 will stop. While motor 340 is running, link 352 will move to the right in Fig. 8—to the left in Fig. 1—and the valve 358 will be gradually opened, reducing the pressure within line 366 and the pressure within line 284 which connects with the oil temperature gauge 286. Accordingly, the gauge 286 will indicate a higher assumed oil temperature.

It will therefore be appreciated that the three valves 274, 312 and 358 control the reading of the oil temperature gauge 286 so that this reading is dependent upon the combined factors of assumed manifold pressure, assumed outside air temperature and the assumed position of the oil shutters.

Figure 9:
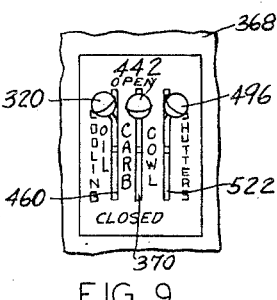
Fig. 9 is a plan view of the shutters control lever plate.

Referring to Fig. 9 it will be seen that a plate 368 is provided bearing the designations "Cooling shutters" and "Open" as well as "Closed." Also, a slot 370 labelled "Oil" is placed in plate 368 and lever 320 may extend through this slot. When lever 320 moves toward "Open," the valve 358 seen in Fig. 1 is closed proportionately so that the oil temperature gauge 286 indicates a lower temperature. On the other hand, when lever 320 is moved toward "Closed" valve 358 of Fig. 1 is opened proportionately so that the oil temperature gauge 286 will indicate a higher assumed temperature. In this manner the student in the fulselage may control the assumed oil temperature in the same manner that the pilot of an actual aircraft controls the real oil temperature.

Fuel pressure

Reference is now made to Fig. 1 where it will be seen that the instructor's control knob 372 is affixed upon the stem 374 of the fuel pressure valve 376 which is connected to the vacuum source through the pneumatic lines 185 and 378 and to the atmosphere through the bleed hole 380. Fuel pressure valve 376 is identical in construction with the valve shown in Fig. 5 with the exception that it has a right thread. The output of this valve is connected through the pneumatic lines 382 and 382a with the fuel pressure gauges 384 and 384a. Each of these gauges has a needle 386 or 386a mounted for movement over its associated dial 388 or 388a. The operative part of each of these gauges is a conventional vacuum gauge and will not therefore be disclosed. As seen in Fig. 7, the control knob 372 is supported by side 310 of the trainer fuselage so as to be accessible from the exterior thereof, and the instructor's instrument 384a is visible from the exterior of the fuselage. The other fuel pressure gauge 384 is located upon the instrument panel inside the fuselage to be viewed by the student. It will be appreciated that the instructor may, by movement of the control knob 372, regulate the readings of the fuel pressure gauges 384 and 384a as desired, and that these gauges will indicate to the student as well as to the instructor the instant assumed fuel pressure, the dial of each of these gauges being suitably calibrated to simulate the dial of the corresponding instrument of a real plane.

Oil pressure

Referring again to Fig. 1 it will be seen that another control knob 390 is mounted upon the stem 392 of the oil pressure gauge valve 394 which is connected to the vacuum source through the pneumatic lines 185 and 396 and to the atmosphere through the bleed 398. This valve, like the valve shown in Fig. 5 with the exception that it is right threaded, is connected through the pneumatic lines 400 and 400a with the instructor's oil pressure gauge 404a and the student's oil pressure gauge 404. Each of these gauges is a conventional vacuum gauge and is provided with a dial 406 or 460a calibrated in the same manner as the dial of the corresponding aircraft instrument. Also each of these instruments has a needle 408 or 408a arranged to move over the dial. Referring to Fig. 7 it will be seen that the instructor's instrument 404a is carried by the wall 310 of the fuselage in order to be visible to the instructor from the exterior thereof while the control knob 390 is positioned to be operated by the instructor. It will be appreciated without a detailed explanation that by manipulation of the control knob 390 the instructor may cause the oil pressure gauges 404 and 404a to indicate any desired assumed oil pressure.

Carburetor air temperature

In the case of actual aircraft, the carburetor air temperature is affected by the three factors of manifold pressure, outside air temperature and the position of the carburetor shutters. Means for simulating the effect of these three factors upon the assumed carburetor air temperature indication in a grounded aviation trainer will now be explained.

Reference is now made to Fig. 1 where the manifold pressure carburetor air temperature valve is designated 410. This valve is identical with the valve shown in Fig. 5, being left threaded, and it will be seen that it is controlled by the manifold pressure unit 24 through the link 268 and the arm 412, the lower end of which is affixed upon the stem 414 of this valve. This valve is connected to the vacuum source through the pneumatic lines 275 and 416 and to the atmosphere through the bleed 418. It is also connected through the vacuum lines 420, 422 and 424 with the carburetor air temperature indicator 426 which comprises a dial 428, graduated like the corresponding instrument of an actual aircraft, as well as a needle 430 which is arranged to move over this dial in accordance with the pressure within the line 424. Instrument 426 is a conventional vacuum gauge, and the lower the pressure within line 424 the farther needle 430 is rotated clockwise, thereby indicating to the student in the fuselage a higher assumed carburetor air temperature. This instrument is mounted upon the instrument panel in the trainer. It will be appreciated, referring to Fig. 1, that as the assumed manifold pressure increases the link 268 moves to the left and therefore the carburetor air temperature valve 410 is closed, resulting in an increase in the pressure within line 420. This increase in pressure is transmitted to the lines 422 and 424 to the carburetor air temperature gauge 426, causing the needle 430 to move counterclockwise to indicate to the student a lower assumed carburetor air temperature. On the other hand, should the factor of assumed manifold pressure decrease, link 268 moves to the right in Fig. 1, opening valve 410 and causing a drop in the pressure within lines 420, 422 and 424, causing gauge 426 to indicate a higher assumed carburetor air temperature.

Still referring to Fig. 1, it will be seen that the valve 432 is provided and that the arm 434 is affixed upon the stem of this valve. This valve is identical with the valve shown in Fig. 5 except that it has a right thread. It is connected to the vacuum source through the lines 185 and 436 and with the atmosphere through the bleed 438, Also this valve is connected to the pneumatic line 422 by the line 440. Accordingly, whenever the link 308 in Fig. 1 moves to the left as a result of a decrease in assumed outside air temperature, which, it will be recalled, is controlled by the manually movable knob 149 which is operated by the instructor, the valve 432 is closed resulting in an increase in the pressure within the line 440. This increase in pressure is transmitted through the lines 422 and 424 to the carburetor air temperature gauge 426 and this gauge reflects a lower assumed outside carburetor air temperature. On the other hand, when the link 308 moves to the right in Fig. 1 as a result of an increase in assumed outside air temperature, the valve 432 is opened proportionately and the pressure within line 440 drops. This drop in pressure is transmitted to the carburetor air temperature gauge 426 through the lines 422 and 424 so that the needle 430 of this gauge is moved clockwise to indicate a higher assumed carburetor air temperature.

Still referring to Fig. 1, it will be seen that a lever 442 simulating the carburetor shutters lever of an actual aircraft is provided, this lever being pivotally mounted about the axis 444 and having pivotally attached to its lower end the forward end of link 446, the rear end of which is pivotally attached to the upper end of arm 448, the lower end of which is affixed upon the stem 450 of the valve 452. This valve is connected to the vacuum source through the lines 185, 360 and 454 as well as to the atmosphere through the bleed 456. Also, this valve is connected by the line 458 to the pneumatic line 424 which connects with the carburetor air temperature indicator 426. Valve 452, being left-threaded, is identical in construction with the valve shown in Fig. 5. Whenever the upper end of lever 442 is moved to the left in Fig. 1, the link 446 moves to the right and by means of the operating arm 448 the valve 452 is closed by an amount dependent upon the angular movement of the lever. Accordingly, the pressure within the outlet line 458 is raised accordingly, and this increase in pressure is transmitted through the line 424 to the carburetor air temperature gauge 426. Needle 430 is rotated counterclockwise proportionately, thereby indicating to the student a proportionate decrease in assumed carburetor air temperature.

On the other hand if lever 442 is moved to the right in Fig. 1, valve 452 is opened proportionately, a decrease in the pressure in line 458 occurs and this decrease is transmitted through the line 424 to the gauge 426. Accordingly, needle 430 rotates clockwise the correct amount to indicate to the student the correct assumed increase in carburetor air temperature.

It will therefore be appreciated that the valve 274 is always opened an amount dependent upon the instant assumed manifold pressure; that the valve 432 is always opened an amount dependent upon the instant assumed outside air temperature; and that the valve 452 is always opened an amount dependent upon the instant assumed setting of the carburetor shutters. Accordingly, the amount of vacuum passing through each of these valves depends upon its instant opening so that the pressure within the line 424 which connects with the gauge 426 is always dependent upon the instant assumed value of each of the three just mentioned assumed factors. Accordingly, the instant indication of the carburetor air temperature gauge 426 is always in accordance with the instant assumed manifold pressure, outside air temperature and position of the carburetor shutters, just as the reading of the carburetor air temperature gauge of a real plane depends upon the factors of manifold pressure, outside air temperature and carburetor shutter setting. The student, of course, uses the lever 442 to control the reading of the gauge 426 just as the pilot of a real plane uses the shutters control lever to control the carburetor air temperature.

Reference is again made to Fig. 9 where it will be seen that a slot 460 designated "Carb" is placed in the plate 368. The carburetor shutters control lever 442 may be mounted for movement in this slot. When the lever 442 is moved to the left in Fig. 1 to close the valve 452, the lever is moved toward "Open" in Fig. 9, and when lever 442 is moved to the right in Fig. 1 to open valve 452, it is moved toward "Closed" in Fig. 9.

*Cylinder head temperature*

Again referring to actual aircraft for purposes of comparison, many aircraft today are provided with a gauge or gauges which indicates to the pilot the instant cylinder head temperature of the engine or engines of the plane. These gauges are mounted upon the instrument panel for easy observation by the pilot in order that he may promptly correct any conditions which may be causing excessive or deficient cylinder head temperatures. The cylinder head temperature as indicated by the gauge depends, in actual aircraft, upon the three factors of manifold pressure, outside air temperature and the setting of the cowl flaps of the plane.

In actual aircraft the higher the manifold pressure the higher is the cylinder head temperature; the lower the outside air temperature, the lower is the cylinder head temperature; and of course, opening of the cowl flaps results in a drop in the cylinder head temperature, while closing the cowl flaps has the opposite effect.

Means for simulating the effects of manifold pressure, outside air temperature and assumed cowl flaps setting upon cylinder head temperature will now be explained.

Referring again to Fig. 1 it will be seen that the arm 462 has its upper end pivotally attached to the link 268 which is always positioned according to the instant assumed manifold pressure. The lower end of arm 462 is affixed upon the stem 464 of the manifold pressure cylinder head temperature valve 468. This valve is connected to the vacuum source through the line 275 and with the atmosphere through the bleed 472. The outlet of valve 468 is connected through the pneumatic lines 474, 476 and 478 with the cylinder head temperature indicator 480 which comprises a dial 482 graduated like the dial of the corresponding instrument in a real plane and a needle 484 mounted for movement over this dial. The operating portion of this instrument is a conventional vacuum gauge and therefore need not be described herein. Valve 468 is identical with the valve shown in Fig. 5, with the exception that it has a right thread, and therefore a detailed disclosure need not be repeated. It will be appreciated that as the factor of assumed manifold pressure increases, link 268 moves to the left in Fig. 1 opening valve 468 and causing a reduction in the pressure within line 474. This reduction in pressure is transmitted through the line 476 and 478 to the cylinder head temperature gauge 480 resulting in a clockwise movement of the needle 484, thus indicating to the student a higher assumed cylinder head temperature.

On the other hand, should the manifold pressure unit 24 be operated in such a manner as to cause a reduction in assumed manifold pressure, link 268 moves to the right in Fig. 1 and valve 468 is closed accordingly. The pressure within line 474 is increased and this increase in pressure is transmitted through the lines 476 and 478 to the cylinder head temperature gauge 480 resulting in a counterclockwise movement of the needle 484, thus indicating to the student a lower assumed cylinder head temperature.

Considering now the effect of assumed outside air temperature upon assumed cylinder head temperature, it will be seen that the valve 486 is provided, this valve being connected with the vacuum source through the lines 490 and 185. Bleed 492 connects this valve with the atmosphere while the outlet 494 of this valve is connected to the pneumatic line 476. This valve is also identical with the valve disclosed in Fig. 5, except it is right threaded. Accordingly, it will be appreciated that as the link 308 moves to the left in Fig. 1 as a result of a decrease in the assumed outside air temperature, (whether caused by a change in altitude or by the instructor), the valve 486 is closed resulting in an increase in the pressure in the outlet line 494. This increase in pressure is transmitted through the lines 476 and 478 to the cylinder head temperature gauge 480 and the needle 484 is rotated counterclockwise, thus indicating to the student a lower assumed cylinder head temperature.

On the other hand, should the link 308 be moved to the right in Fig. 1 as a result of an increase in assumed outside air temperature, valve 486 is opened proportionately, resulting in the proper decrease in the pressure in the output line 494. This decrease in pressure in line 494 is transmitted through the lines 476 and 478 to the cylinder head temperature gauge 480 resulting in a clockwise rotation of the needle 484, thus indicating to the student a higher assumed cylinder head temperature.

Considering now the factor of assumed cowl flap setting upon cylinder head temperature, it will be seen in Fig. 1 that a lever 496 simulating the cowl flaps setting lever of a real plane is provided. This lever is mounted for pivoting about the axis 498 and pivotally attached to its lower end is the forward end of link 500, the rear end of which is pivotally attached to the upper end of arm 502, the position of which controls the operation of the follow-up motor 504 in the same manner that the position of arm 326 controls the follow-up motor 340 shown in Fig. 8. Inasmuch as the follow-up motor 504 and its associated energizing means are identical with the arrangement shown in Fig. 8, a detailed description thereof will not be given. It is sufficient to state that a movement to the right in Fig. 1 of link 500 results in a clockwise rotation of the arm 506 through a proportionate angle, while a movement of link 500 to the left in Fig. 1 results in a counterclockwise rotation of arm 506 through a proper angle. Pivotally attached to the upper end of arm 506 is the forward end of link 508, the rear end of which is pivotally attached to the upper end of arm 510, the lower end of which is affixed upon the stem 512 of the valve 514. This valve is connected through the pneumatic lines 185, 360 and 516 with the vacuum source and is connected with the atmosphere through the bleed 518. Also the output of this valve is connected to the line 520 which connects with the cylinder head temperature gauge 480 through line 478. This valve 514, being left-threaded and otherwise identical with the valve shown in Fig. 5, will not be described in detail.

It will be appreciated that when the lever 496 is moved to the left in Fig. 1, the link 508 moves to the right causing the arm 510 to close the valve 514 a proportionate amount. The pressure within the output line 520 is increased and this increase in pressure is transmitted through the lines 520 and 478 to the cylinder head temperature gauge 480, resulting in a counterclockwise rotation of needle 484 thus indicating to the student a lower assumed cylinder head temperature. On the other hand, whenever lever 496 is moved to the right in Fig. 1, link 508 moves to the left and valve 514 is opened resulting in a decrease in the pressure within line 520 which is transmitted through line 478 to the cylinder head temperature gauge 480, resulting in a clockwise rotation of needle 484 and thus indicating to the student a higher assumed cylinder head temperature. Because of the delay inherent in the operation of the follow-up motor 504 in response to movements of lever 496, it will be appreciated that a suitable time delay occurs between the movements of lever 496 and the changes in the indications given by the indicator 480. This simulates the gradual response of the cylinder head temperature in a real plane to a change in the cowl flap setting.

Reference is again made to Fig. 9 where it will be seen that a third slot 522 labeled "Cowl" is provided in the plate 368. Lever 496 may be mounted for movement in slot 522, a movement to the left in Fig. 1 corresponding to a movement toward the end of plate 368 labeled "Open" and a movement to the right in Fig. 1 corresponding to a movement toward the "Closed" end of plate 368.

In view of the above explanation it will be appreciated that the indication given by the cylinder head temperature gauge 480 depends upon the combined factors of manifold pressure, assumed outside air temperature and the assumed setting of the cowl flaps. As the manifold pressure increases, the cylinder head temperature increases; as the outside air temperature increases, the cylinder head temperature increases, and as the cowl flaps lever is moved to a farther "Open" position, the assumed cylinder head temperature decreases. Opposite changes in any one of these three factors produce opposite effects upon the indicated cylinder head temperature.

*Engine vibration system*

Reference is now made to Fig. 1 where it will be seen that the forward end of link 224a the rear end of which is pivoted to the lower end of arm 226, is, as shown in the upper middle portion of the drawing, pivotally connected to the walking beam 530 which is pivotally mounted upon the stud 532 which is affixed upon the lower end of arm 534, the upper end of which is affixed upon the rotor 536 of the variac 538. At the same time the forward end of link 539 is pivotally connected to the upper end of walking beam 530, the rear end of this link being pivotally attached to the upper end of lever 248 which operates the throttle tachometer valve 252.

Figure 10:
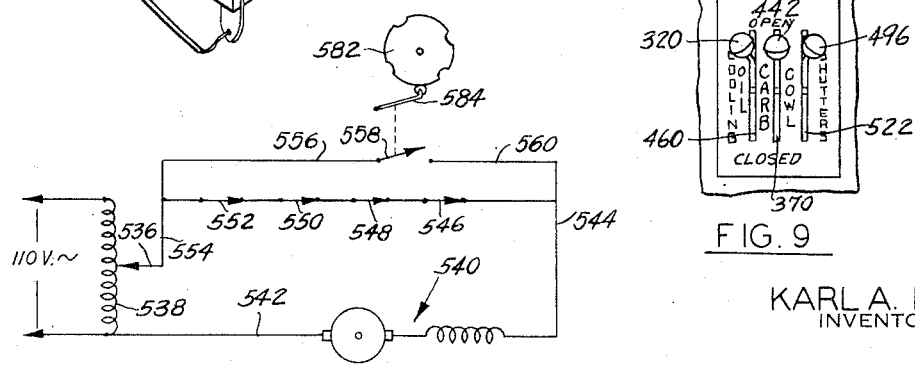
Fig. 10 is a wiring diagram of the vibration motor.

Reference is now made to Figs. 1 and 10 where it will be seen that the motor 540 is provided, and that this motor is connected to a source of current through the conductors 542, 544, the four series switches 546, 548, 550 and 552, conductor 554 and the rotor 536 of variac 538. The circuit through motor 540 may, alternatively, be completed through conductor 556, switch 558 and conductor 560. In Fig. 1 the rotor of motor 540 is designated 562, and affixed upon the outer end of this rotor is the eccentrically balanced weight 564. Motor 540 is fixedly attached to the fuselage of the trainer.

Ordinarily the series switches 546, 548, 550 and 552 are closed, and when such is the case it will be appreciated that the motor will run at a speed dependent upon the setting of the rotor 536 of variac 538. When the engine speed lever 222 is pushed forward to give a higher assumed engine speed, as indicated by the tachometer 236, the link 224 moves to the rear, moving the arm 530 which pivots about the point at which link 242 is attached thereto, and operating the rotor 536 of variac 538 to increase the voltage across the motor and thereby increase its speed. The eccentric weight attached to the rotor of the motor will vibrate the fuselage at a rate dependent upon the speed of the motor. On the other hand, when the engine speed lever 222 is moved to the rear, opposite results occur—the vibration frequency imparted to the fuselage being lower and the tachometer indication similarly falling off.

It will be noted that movements of the throttle lever 12 correctly do not affect the speed of motor 540, except when the throttle lever 12 is positioned to the rear of a predetermined position so as to move the block 244 in contact with the block 246 on the lower end of arm 248, at which time link 539 moves to the rear, rotating the rotor 536 of variac 538 counterclockwise, slowing down motor 540 and reducing the frequency of vibration of the fuselage.

Accordingly, this invention provides means for vibrating the fuselage in accordance with the assumed engine speed as given by the tachometer indicator 236.

Referring again to the case of an actual aircraft for purposes of comparison, whenever the carburetor air temperature or cylinder head temperature becomes too high or too low, the engine fires erratically and the plane vibrates in a noticeable manner. Means for simulating this effect will now be disclosed.

Still referring to Fig. 1, it will be noted that the vacuum line 566 connects the line 424 leading to the carburetor air temperature gauge 426 with the interior of the expansible-collapsible bellows 568. This bellows has affixed thereto a rigid rod 570 against which the rollers 572 and 574 are normally pressed by the resilient switch arms 572a and 574a, as more clearly shown in Fig. 11. Roller 572 controls switch 546 and roller 574 controls switch 548, these switches also being shown in Fig. 10. Whenever the assumed carburetor air temperature becomes too high, as indicated by indicator 426, bellows 568 is collapsed to such an extent that rod 570 is pulled upwardly past roller 574 and roller 574 moves to the left and switch 548 is opened. On the other hand, if bellows 568 becomes expanded too much in response to a too low assumed carburetor air temperature, the inclined surface 568a engages roller 572 to force roller 572 to the left, opening switch 546.

Also in Fig. 1 there is shown the line 576 connecting the line 478 which connects with the cylinder head temperature gauge 480 with the interior of bellows 578 which controls the two switches 550 and 552 in the same manner as bellows 568 controls the two switches 546 and 548. Accordingly, when cylinder head temperature becomes too high, switch 552 is opened, and when it becomes too low switch 550 is opened.

Referring now to Fig. 10 and recalling that the switches 546, 548, 550 and 552 are all normally closed, whenever either carburetor air temperature or cylinder head temperature becomes too high or too low, one or two of the switches 546, 548, 550 or 552 will be opened and the normal circuit to motor 540 will be broken. However, the circuit including conductor 556, switch 558 and conductor 544 to motor 540 will be made whenever switch 558 is closed.

Referring now to Fig. 1 for a disclosure of the means for controlling switch 558, it will be seen that a constant speed motor 580 is provided for rotating the cam 582 at all times. Cam 582 intermittently makes and breaks the switch 558 through the roller 584 which rides upon the periphery of this cam. Accordingly, when either of switches 546, 548, 550 or 552 is open, motor 540 is intermittently energized by the constant making and breaking of switch 558, and the speed of this motor will be intermittently increased and decreased, thus imparting an intermittent vibration to the fuselage simulating the vibration of an airplane caused by a too high or too low carburetor air temperature or cylinder head temperature.

Of course the student in the trainer should operate the carburetor air temperature control lever 442 and/or the cylinder head temperature control lever 496 in order to prevent too high or too low temperatures, but in the event he fails to do so the intermittent vibration of the fuselage will warn him and he may then operate the controls in the correct manner to bring these factors into proper range.

*Conclusion*

It will therefore be appreciated that the stated and other objects of my invention, as outlined more fully in the introduction hereof, have been satisfied by this disclosure. Many changes may be made in the disclosed embodiment of my invention without departing from the substance thereof, and all such changes are intended to be covered by the following claims.

I claim:

1. In a grounded aviation trainer for the instruction of students in the flying of aircraft, the combination of an instrument comprising a vacuum gauge and a dial graduated in a manner corresponding to the graduations of an engine instrument of a real plane, a vacuum line connected to said gauge, a first valve and a source of vacuum, said source of vacuum being connected to said vacuum line through said first valve, means for operating said first valve to change the pressure in said line and the reading of said instrument, a second valve interconnecting said source of vacuum and said vacuum line, a tank in said trainer having a variable pressure therein dependent upon the assumed altitude of said trainer, and means comprising an expansible-contractible member interconnecting said tank and said second valve for operating said second valve in response to changes in the pressure in said tank, to change the pressure within said vacuum line.

2. In a grounded aviation trainer for the instruction of students in the flying of aircraft, the combination of an outside air temperature gauge comprising a first vacuum gauge having a dial graduated to simulate the outside air temperature gauge of a real plane, a first fluid line connected to said first gauge, a source of vacuum and means comprising a first valve interconnecting said source of vacuum and said first fluid line, a first manually operable control connected to said first valve for operating the same to change the pressure in said first fluid line, a cylinder head temperature gauge comprising a second vacuum gauge having a dial graduated to simulate the cylinder head temperature gauge of a real plane, a second fluid line connected to said second gauge, means comprising a second valve interconnecting said vacuum source with said second fluid line, means comprising a third valve interconnecting said vacuum source and said second line, a second manually operable control simulating the cylinder head temperature control of a real plane, means interconnecting said first manually operable control and said second valve for operating said second valve simultaneously with the operation of said first valve to change the pressure in said second line simultaneous with a changing of the pressure in said first line, and means interconnecting said second manually operable control and said third valve for operating said third valve to offset the pressure change in said second line caused by an operation of said first manually operable control.

3. In a grounded aviation trainer for the instruction of students in the flying of aircraft, the combination of an outside air temperature gauge comprising a first vacuum gauge having a dial graduated to simulate the outside air temperature gauge of a real plane, a first fluid line connected to said first gauge, a source of vacuum and means comprising a first valve interconnecting said source of vacuum and said first fluid line, a first manually operable control connected to said first valve for operating the same to change the pressure in said first fluid line, a cylinder head temperature gauge comprising a second vacuum gauge having a dial graduated to simulate the cylinder head temperature gauge of a real plane, a second fluid line connected to said second gauge, means comprising a second valve interconnecting said vacuum source with said second fluid line, means comprising a third valve interconnecting said vacuum source and said second line, a second manually operable control simulating the cylinder head temperature control of a real plane, means interconnecting said first manually operable control and said second valve for operating said second valve simultaneously with the operation of said first valve to change the pressure in said second line simultaneous with a changing of the pressure in said first line, and means comprising time-delay means interconnecting said second manually operable control and said third valve for operating said third valve to offset the pressure change in said second line caused by an operation of said first manually operable control.

4. In a grounded aviation trainer for the instruction of students in the flying of aircraft, the combination of an outside air temperature gauge comprising a first vacuum gauge having a dial graduated to simulate the outside air temperature gauge of a real plane, a first fluid line connected to said first gauge, a source of vacuum and means comprising a first valve interconnecting said source of vacuum and said first fluid line, a first manually operable control connected to said first valve for operating the same to change the pressure in said first fluid line, an oil temperature gauge comprising a second vacuum gauge having a dial graduated to simulate the oil temperature gauge of a real plane, a second fluid line connected to said second gauge, means comprising a second valve interconnecting said vacuum source with said second fluid line, means comprising a third valve interconnecting said vacuum source and said second line, a second manually operable control simulating the oil temperature control of a real plane, means interconnecting said first manually operable control and said second valve for operating said second valve simultaneously with the operation of said first valve to change the pressure in said second line simultaneous with a changing of the pressure in said first line, and means interconnecting said second manually operable control and said third valve for operating said third valve to offset the pressure change in said second line caused by an operation of said first manually operable control.

5. In a grounded aviation trainer for the instruction of students in the flying of aircraft, the combination of an outside air temperature gauge comprising a first vacuum gauge having a dial graduated to simulate the outside air temperature gauge of a real plane, a first fluid line connected to said first gauge, a source of vacuum and means comprising a first valve interconnecting said source of vacuum and said first fluid line, a first manually operable control connected to said first valve for operating the same to change the pressure in said first fluid line, a carburetor air temperature gauge comprising a second vacuum gauge having a dial graduated to simulate the carburetor air temperature gauge of a real plane, a second fluid line connected to said second gauge, means comprising a second valve interconnecting said vacuum source with said second fluid line, means comprising a third valve interconnecting said vacuum source and said second line, a second manually operable control simulating the carburetor air temperature control of a real plane, means interconnecting said first manually operable control and said second valve for operating said second valve simultaneously with the operation of said first valve to change the pressure in said second line simultaneous with a changing of the pressure in said first line, and means interconnecting said second manually operable control and said third valve for operating said third valve to offset the pressure change in said second line caused by an operation of said first manually operable control.

KARL A. KAIL.

REFERENCES CITED

The following references are of record in the file of this patent:

UNITED STATES PATENTS

| Number | Name | Date |
| --- | --- | --- |
| 2,099,857 | Link | Nov. 23, 1937 |
| 2,218,546 | Muller | Oct. 22, 1940 |
| 2,327,997 | Carmody et al. | Aug. 31, 1943 |
| 2,336,711 | Barber | Dec. 14, 1943 |
| 2,358,016 | Link | Sept. 12, 1944 |
| 2,362,486 | Holbert | Nov. 14, 1944 |
| 2,372,741 | Roberts-Horsfield, Jr. | Apr. 3, 1945 |
| 2,381,872 | Baker | Aug. 14, 1945 |
| 2,439,168 | Kail | Apr. 6, 1948 |
| 2,450,239 | Kail | Sept. 28, 1948 |